United States Patent
Jain et al.

(10) Patent No.: US 6,324,575 B1
(45) Date of Patent: Nov. 27, 2001

(54) INTELLIGENT SELECTION OF MULTICAST FILTERING MODES FOR SWITCH PORTS

(75) Inventors: Vipin Kumar Jain, Santa Clara; Peter Si-Sheng Wang, Cupertino, both of CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/240,360

(22) Filed: Jan. 29, 1999

(51) Int. Cl.$^7$ .................................................. G06F 13/00
(52) U.S. Cl. .......................... 709/221; 709/224; 709/223
(58) Field of Search ................................... 709/221, 224, 709/223; 370/360

(56) References Cited

U.S. PATENT DOCUMENTS

| | | | |
|---|---|---|---|
| 5,530,703 | * | 6/1996 | Liu et al. .............................. 370/255 |
| 5,920,698 | * | 7/1999 | Ben-Michael et al. ............... 709/224 |
| 6,016,310 | * | 1/2000 | Muller et al. ......................... 370/255 |
| 6,154,446 | * | 11/2000 | Kadambi et al. ..................... 370/239 |
| 6,216,167 | * | 4/2001 | Momirov .............................. 709/238 |

* cited by examiner

Primary Examiner—Kenneth R. Coulter
(74) Attorney, Agent, or Firm—Wagner, Murabito & Hao LLP

(57) ABSTRACT

A method and system for intelligently selecting the multicast filtering mode of a port in a switch. In one embodiment the present invention determines whether a client is coupled to a port of a switch. In such an embodiment, provided that a client is coupled to the port, the present invention monitors the client to determine if the client is 802.1p compliant. Next, in this embodiment, provided that the client is 802.1p compliant, the present invention automatically selects a Filter Unregistered Groups mode for the port to which the client is coupled. Conversely, if the client is not 802.1p compliant, the present invention selects a Forward All Groups mode for the port to which the client is coupled. In so doing, the present invention intelligently selects the optimal multicast filter mode for a switch and its connected clients. Additionally, the present invention eliminates the need for expensive, time-consuming, and error-prone network administrator intervention.

25 Claims, 4 Drawing Sheets

INTELLIGENT SELECTION OF MULTICAST FILTERING MODES FOR SWITCH PORTS

TECHNICAL FIELD

The present invention generally pertains to the field of computer networking. More particularly, the present invention is related to multicast filtering modes for a port of a switch.

BACKGROUND ART

Computers have become an integral tool used in a wide variety of different applications, such as in finance and commercial transactions, computer-aided design and manufacturing, health-care, telecommunication, education, etc. Computers are finding new applications as a result of advances in hardware technology and rapid development in software technology. Furthermore, a computer system's functionality is dramatically enhanced by coupling stand-alone computers together to form a computer network. In a computer network, users may readily exchange files, share information stored on a common database, pool resources, and communicate via e-mail and via video teleconferencing.

Computer networks can be arranged in numerous configurations comprising a variety of network types. Some of the most popular types of networks comprise Ethernet (coaxial cable or twisted- pair cable), token ring, Fiber Distributed Data Interface (FDDI), Frame Relay, Integrated Services Digital Network (ISDN), X.25, Synchronous Data Link Control (SDLC). Typically, these networks are arranged in local area networks (LANs) and wide area networks (WANs). Usually, LANs are distinguished from WANs based upon the geographical area they cover and sometimes the number of users connected to the network. For example, a group of personal computers (PCs) in a home or single business site (location) usually communicate with each other over a LAN. Groups of PCs disposed remote from one another, such as those in different homes, different companies, or different branch offices of the same company, typically communicate with each other over a WAN.

In many networking environments, the 802.1D 1998 Institute of Electrical and Electronics Engineering (IEEE) standard is employed. Incorporated into the IEEE 802.1D 1998 edition is the 802.1p protocol. 802.1p augments the Internet Group Management Protocol (IGMP) and provides a mechanism for clients to register with their connecting switches to receive multicast packets. Such registration is, in turn, propagated to other nodes in the same broadcast domain. Because registration and forwarding of multicast packets is port-centric, a problem arises when a port is connected to legacy client (i.e. clients which have not been upgraded to utilize 802.1p ) or to a combination of legacy and 802.1p compliant clients. Because the legacy clients are not versed in 802.1p, forwarding of multicast packets based solely upon port registration (e.g. Group Multicast Registration Protocol) could exclude the legacy clients from receiving desired multicast packets.

Thus, under conventional schemes, a network administrator must diligently review each port of a switch and each client or clients coupled thereto. Such inspection requires a network administrator with substantial network expertise and a thorough knowledge of 802.1D and 802.1p protocols. After inspection, the network administrator must manually set port settings for each port of the switch based upon the 802.1p compliance (or lack thereof) of the clients coupled to the respective ports. This inspection process must be constantly repeated with corresponding port settings revised accordingly in order to remain current with newly added or recently removed clients. In addition to being time-consuming, such a process is expensive, and is extremely error prone. As a result, legacy clients may be prevented from receiving desired multicast packets in conventional network implementations.

Thus, a need exists for a method and system which allows a legacy client to operate effectively in an 802.1p environment. Still another need exists for a method and system which allows the legacy client to operate effectively in an 802.1p environment even when the legacy client shares a common port of a switch with an 802.1p compliant client. Still another need exists for a system and method which meets the above-listed needs but which does not require constant network administrator intervention or network administrator sophistication.

DISCLOSURE OF THE INVENTION

The present invention provides a method and system which allows a legacy client to operate effectively in an 802.1p environment. The present invention further provides a method and system which allows the legacy client to operate effectively in an 802.1p environment even when the legacy client shares a common port of a switch with an 802.1p compliant client. Furthermore, the present invention provides a system and method which meets the above-listed needs but which does not require constant network administrator intervention or network administrator sophistication.

In one embodiment the present invention determines whether a client is coupled to a port of a switch. In such an embodiment, provided that a client is coupled to the port, the present invention monitors the client to determine if the client is 802.1p compliant. Next, in this embodiment, provided that the client is 802.1p compliant, the present invention automatically selects a Filter Unregistered Groups mode for the port to which the client is coupled. Conversely, if the client is not 802.1p compliant, the present invention selects a Forward All Groups mode for the port to which the client is coupled. In so doing, the present invention intelligently selects the optimal multicast filter mode for a switch and its connected clients. Additionally, the present invention eliminates the need for expensive, time-consuming, and error-prone network administrator intervention. The present invention further ensures that a legacy client will not be prevented from receiving desired multicast packets.

In another embodiment, the present invention determines whether a plurality of clients are coupled to a port of a switch. In such an embodiment, provided that a plurality of clients are coupled to the port, the present invention monitors each of the plurality clients to determine if each of the plurality of clients is 802.1p compliant. Next, in this embodiment, provided that each of the plurality of clients is 802.1p compliant, the present invention automatically selects a Filter Unregistered Groups mode for the port to which each of the plurality of clients is coupled. Conversely, if at least one of the plurality of clients is not 802.1p compliant, the present invention selects a Forward All Groups mode for the port to which each of the plurality of clients is coupled. In so doing, the present invention intelligently selects the optimal multicast filter mode for a switch and its connected clients. Additionally, the present invention eliminates the need for expensive, time-consuming, and error-prone network administrator intervention. The present invention further ensures that a legacy client will not be prevented from receiving desired multicast packets even when the legacy client shares a port with a 802.1p compliant client.

These and other advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Figure 1:
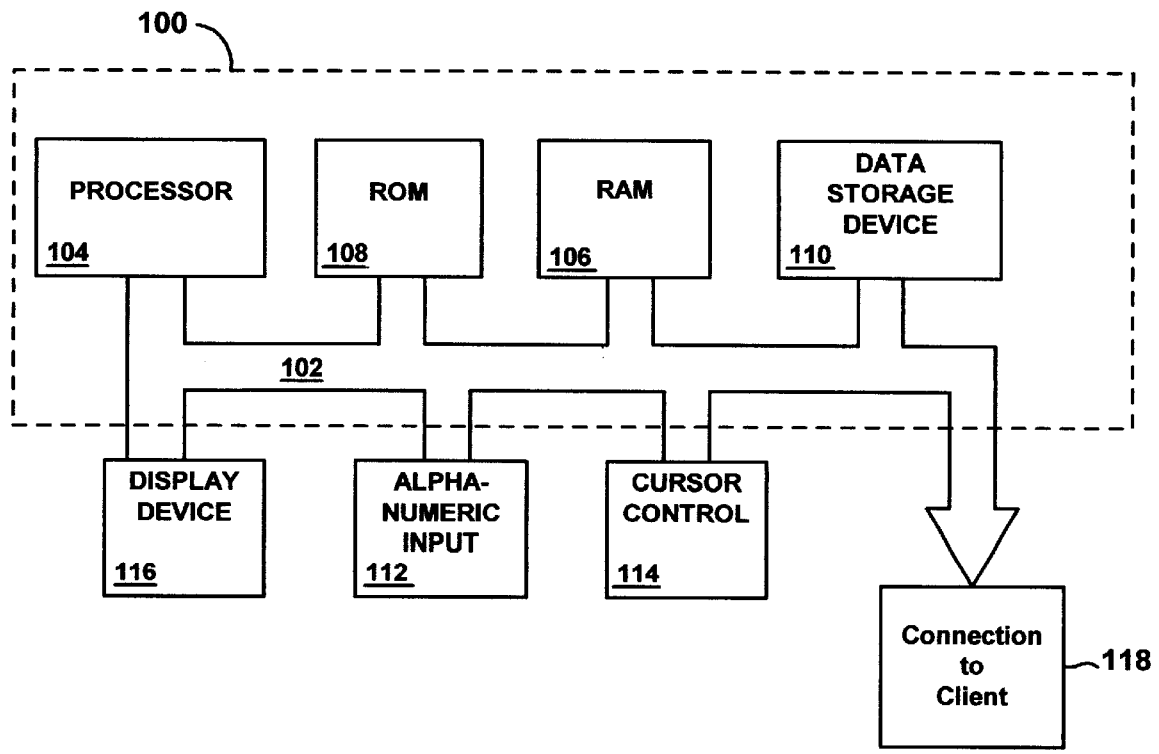
FIG. 1 is a schematic diagram of an exemplary computer system used to perform steps of the present method in accordance with one embodiment of the present invention.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining", "monitoring", "prompting", "setting" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers. Although the present application will refer to a computer system, for purposes of the present application, a computer system is intended to refer to, for example, a network switch. Hence, the following discussion which refers to processes performed by a computer system also pertains to processes performed by a network switch (referred to simply as a switch) of the present invention.

COMPUTER SYSTEM ENVIRONMENT OF THE PRESENT INVENTION

With reference now to FIG. 1, portions of the present method and system are comprised of computer-readable and computer-executable instructions which reside, for example, in computer-usable media of a computer system. FIG. 1 illustrates an exemplary computer system 100 used to perform the present invention. It is appreciated that system 100 of FIG. 1 is exemplary only and that the present invention can operate within a number of different computer systems including general purpose networked computer systems, embedded computer systems, and stand alone computer systems. Furthermore, as will be described below in detail, the components of computer system 100 reside, for example, in a client computer and/or in the intermediate device of the present system and method. Additionally, computer system 100 of FIG. 1 is well adapted having computer readable media such as, for example, a floppy disk, a compact disc, and the like coupled thereto. Such computer readable media is not shown coupled to computer system 100 in FIG. 1 for purposes of clarity.

System 100 of FIG. 1 includes an address/data bus 102 for communicating information, and a central processor unit 104 coupled to bus 102 for processing information and instructions. Central processor unit 104 may be an 80×86-family microprocessor. System 100 also incudes data storage features such as a computer usable volatile memory 106, e.g. random access memory (RAM), coupled to bus 102 for storing information and instructions for central processor unit 104, computer usable non-volatile memory 108, e.g. read only memory (ROM), coupled to bus 102 for storing static information and instructions for the central processor unit 104, and a data storage unit 110 (e.g., a magnetic or optical disk and disk drive) coupled to bus 102 for storing information and instructions. System 100 of the present invention also includes an optional alphanumeric input device 112 including alphanumeric and function keys is coupled to bus 102 for communicating information and command selections to central processor unit 104. System 100 also optionally includes a cursor control device 114 coupled to bus 102 for communicating user input information and command selections to central processor unit 104. System 100 of the present embodiment also includes an optional display device 116 coupled to bus 102 for displaying information. Additionally, computer system 100 of the present embodiment includes feature 118 for connecting computer system 100 (e.g. switch 210 of FIG. 2) to a client.

Referring still to FIG. 1, optional display device 116 of FIG. 1, may be a liquid crystal device, cathode ray tube, or other display device suitable for creating graphic images and alphanumeric characters recognizable to a user. Optional cursor control device 114 allows the computer user to dynamically signal the two dimensional movement of a visible symbol (cursor) on a display screen of display device 116. Many implementations of cursor control device 114 are known in the art including a trackball, mouse, touch pad, joystick or special keys on alphanumeric input device 112 capable of signaling movement of a given direction or manner of displacement. Alternatively, it will be appreciated that a cursor can be directed and/or activated via input from alphanumeric input device 112 using special keys and key sequence commands. The present invention is also well suited to directing a cursor by other means such as, for example, voice commands. A more detailed discussion of the method and system embodiments of the present invention are found below.

DETAILED DESCRIPTION OF THE ENVIRONMENT OF THE PRESENT INVENTION

Figure 2:
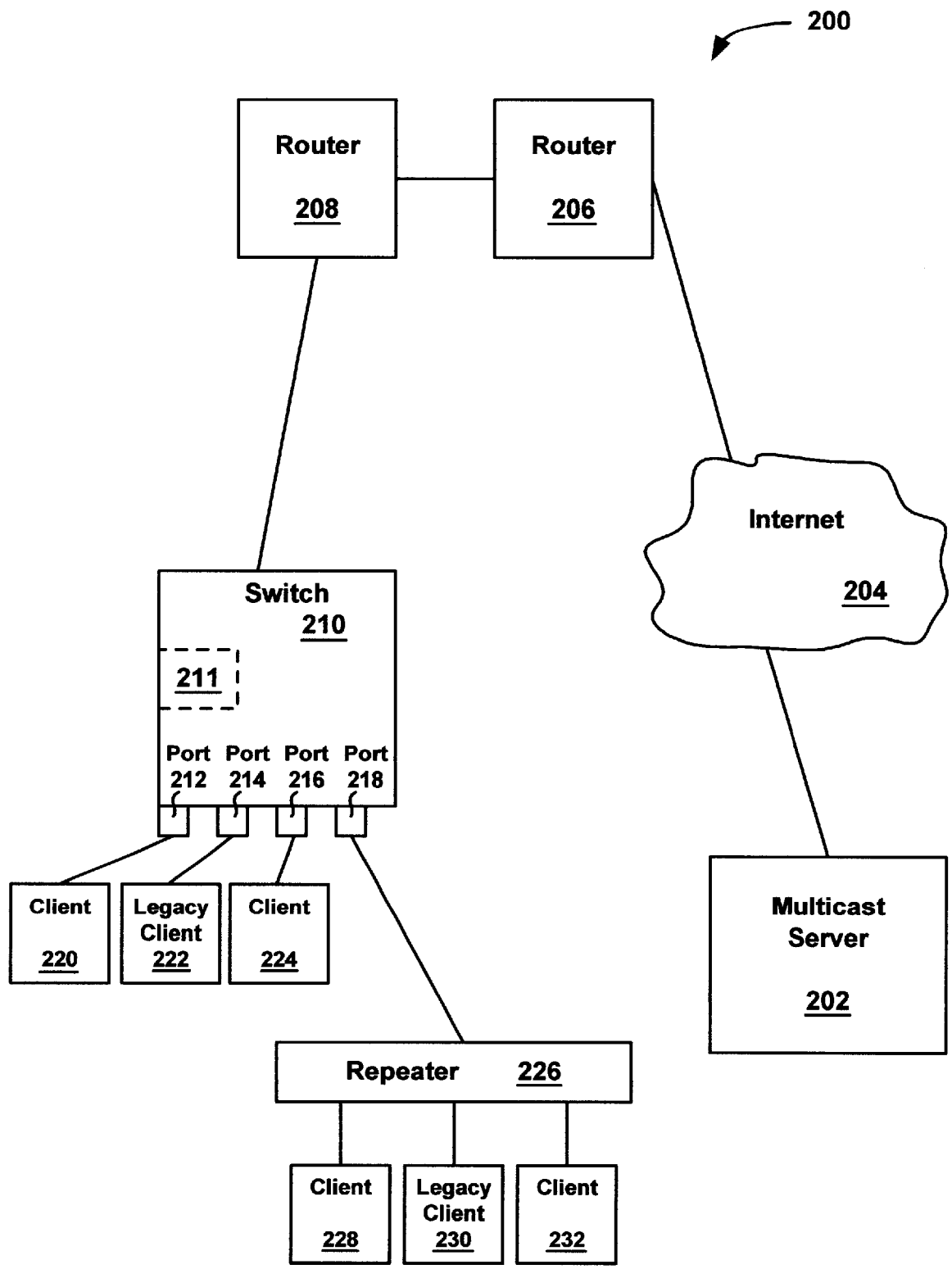
FIG. 2 is a schematic representation of a network architecture in which is employed a system and method for intelligently selecting the multicast filtering mode of a port in a switch in accordance with one embodiment of the present invention.

With reference now to FIG. 2, a schematic representation of a network architecture 200 in which is employed a system and method for intelligently selecting the multicast filtering mode of a port in a switch in accordance with one embodiment of the present invention is shown. The present discussion will begin with a detailed description of the structure and physical components relevant to the present invention. The discussion will then describe, in detail, the operation the components of network architecture 200 and the various embodiments of the present invention. Referring again to FIG. 2, network architecture 200 includes a multicast server 202 which is coupled to the internet 204. Internet 204, in turn, is coupled to a first router 206. Router 206 is then coupled to a second router 208 which is coupled to switch 210. It will be understood that numerous other components may be present between switch 210 and multicast server 202 and numerous other components will exist in a typical network architecture. For purposes of clarity, the various other components are not shown in FIG. 2. Switch 210 includes memory 211 such as, for example, ROM 108 and/or RAM 106 of FIG. 1. Switch 210 also includes several ports 212, 214, 216, and 218. Once again, it will be understood that a typical switch may have less or considerably more ports, however, for purposes of clarity only 4 ports 212, 214, 216, and 218 are shown in FIG. 2. Switch 210 of the present embodiment may contain, for example, some of the features of computer system 100 described above in detail in conjunction with FIG. 1.

Referring still to FIG. 2, clients 220, 222, 224, 228, 230, and 232 are coupled to respective ports of switch 210. In architecture 200 of FIG. 2, clients 220, 222, 224, 228, 230, and 232 are personal computers (PCs), however, although the clients are PCs in network architecture 200, the present invention is also well suited to an embodiment in which clients 220, 222, 224, 228, 230, and 232 are comprised of devices other than PCs (e.g. personal digital assistants, servers, and the like). Additionally, although only six clients 220, 222, 224, 228, 230, and 232 are shown for purposes of clarity, the present invention is also well suited to a use with a system having a greater or lesser number of clients. Furthermore, in architecture 200, clients 222 and 230 are legacy clients. The relevance of legacy clients 222 and 230 will be set forth in detail below. In architecture 200 of FIG. 2, port 218 of switch 210 has a repeater 226 coupled thereto. Clients 228, 230, and 232 are coupled to repeater 226. Therefore, unlike clients 220, 222, and 224 which each have a respective port dedicated solely thereto, clients 228, 230, and 232 share port 218 via repeater 226.

DETAILED DESCRIPTION OF THE OPERATION OF THE PRESENT INVENTION

Figure 3A:
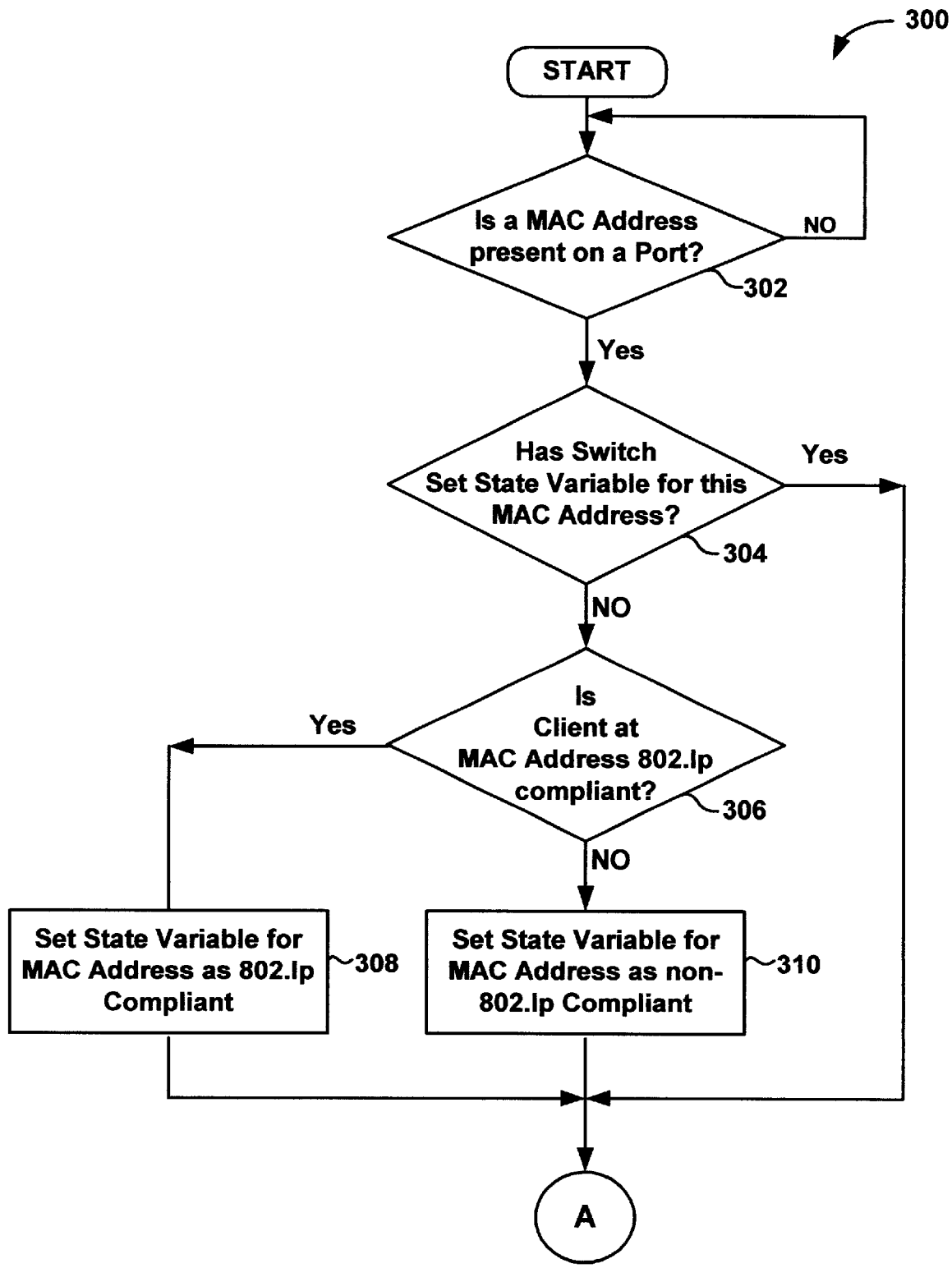
FIGS. 3A and 3B are a flow chart of steps performed in accordance with one embodiment of the present claimed invention.
Figure 3B:
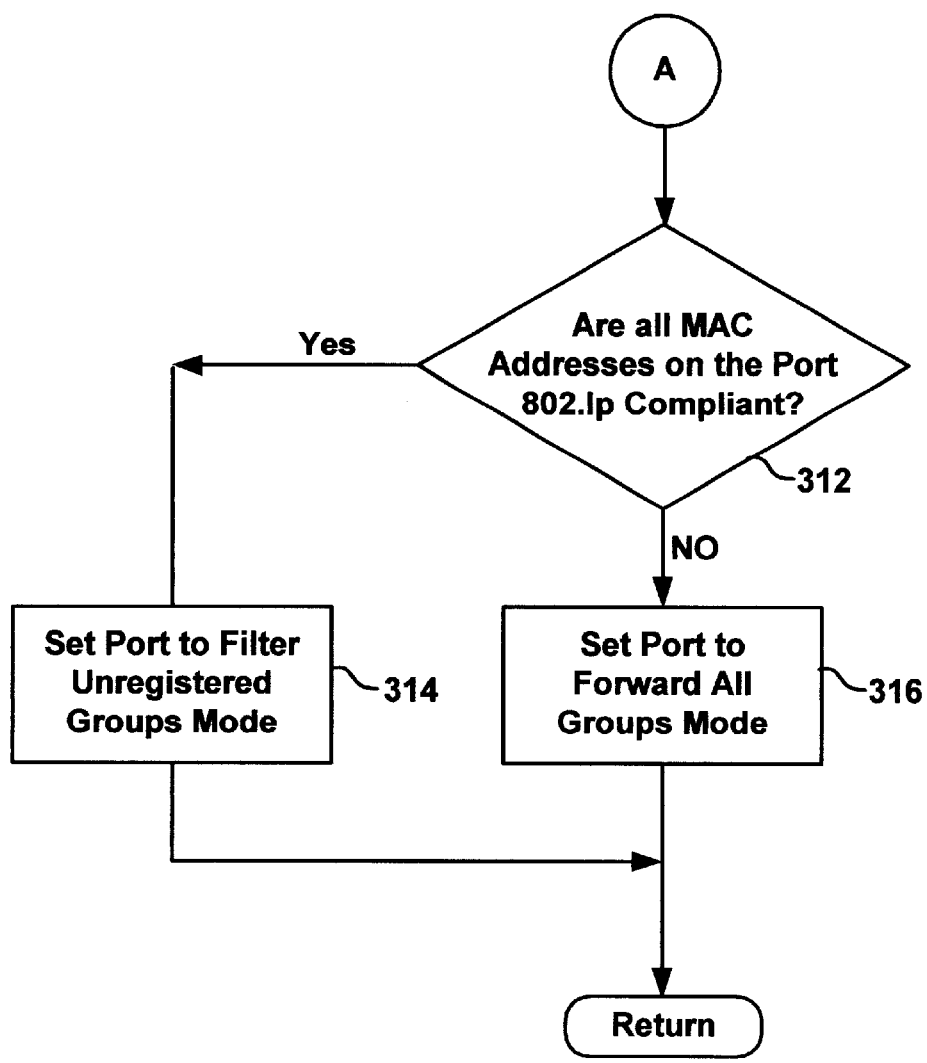

With reference next to FIGS. 3A and 3B, a flow chart 300 of exemplary steps performed in one embodiment of the present invention is shown. Flow chart 300 includes processes of the present invention which, in one embodiment, are carried out by a processor under the control of computer-readable and computer-executable instructions. The computer-readable and computer-executable instructions reside, for example, in data storage features such as computer usable volatile memory 106 and/or computer usable non-volatile memory 108 of FIG. 1 physically residing, for example, in switch 210 of FIG. 2. The computer-readable and computer-executable instructions are used to control or operate in conjunction with, for example, central processing unit 104 of FIG. 1. As mentioned above, the features of the computer system of FIG. 1 are well suited to being disposed, for example, in switch 210. Although specific steps are disclosed in flow chart 300 of FIGS. 3A and 3B, such steps are exemplary. That is, the present invention is well suited to performing various other steps or variations of the steps recited in FIGS. 3A and 3B.

The steps of the present embodiment will be described in conjunction with the physical components of FIG. 2. As an overview, the following discussion pertain to the operation of switch 210. Specifically, in the embodiments of the present invention, switch 210 intelligently selects multicast registration modes for ports 212, 214, 216, and 218 to ensure that clients 220, 222, 224, 228, 230, and 232 are not prevented from receiving desired multicast packets. That is, in the present invention multicast packets sent for example from multicast server 202 are transmitted through internet 204, through routers 206 and 208, and are then received by switch 210. By intelligently selecting appropriate multicast registration modes for each of ports 212, 214, 216, and 218 (in a manner which will be described below in detail), the present invention ensures that clients 220, 222, 224, 228, 230, and 232 receive desired multicast packets.

With reference to FIG. 3A, at step 302, the present embodiment first determines whether a MAC (media access control) address is present at any of ports 212, 214, 216, and 218. That is, switch 210 of the present invention determines whether or not a client or clients (e.g. clients 220, 222, 224, 228, 230, and 232) is present at ports 212, 214, 216, and 218. In the embodiment of FIG. 2, for example, one MAC address is present at each of ports 212, 214, and 216. At port 212, the MAC address for client 220 is present, at port 214, the MAC address for legacy client 222 is present, and at port 216, the MAC address for client 224 is present. However, at port 218, three MAC addresses are present. That is, at port 218, one MAC address for client 228 is present, a second MAC address for legacy client 230 is present, and a third MAC address for client 232 is present. The importance of step 302 is many-fold in that new clients may be coupled to switch 210 at any time, and existing clients may be removed from switch 210 at any given time.

Referring still to step 302, if no MAC address is present at a given port, the present embodiment repeats step 302. If, however, a MAC address (i.e. one or more clients) is detected in step 302, the present embodiment proceeds to step 304.

In step 304, the present embodiment determines whether switch 210 has set a state variable for the detected MAC address (or MAC addresses) at each port. As mentioned above, in the present embodiment, switch 210 of the present invention includes memory 211. In this embodiment, switch 210 will eventually store in memory 211 a state variable which is then kept with the respective MAC address previously learned by switch 210 in step 302. Thus, in some instances, at step 302 switch 210 of the present invention will detect a MAC address for which it has already stored a state variable. If so, the present embodiment skips to step 312. If switch 210 of the present invention finds that no state variable was previously stored for the MAC address, the present embodiment proceeds to step 306.

Referring now to step 306, switch 210 of the present invention determines whether or not the client at the MAC address is 802.1p compliant. That is, switch 210 determines whether or not the client is capable of speaking GMRP (Group Multicast Registration Protocol). In this embodiment, switch 210 monitors the client or clients which do not yet have a state variable stored in memory 211. If switch 210 detects a GMRP message from the client within a preselected time period, the present embodiment proceeds to step 308. If switch 210 does not detect a GMRP message from the client within a preselected time period, the present embodiment proceeds to step 310. In the present embodiment, once a client is believed to be 802.1p compliant, the client is not required to refresh its status (i.e. indicate 802.1p compliance or lack thereof) for every multicast session. Instead, in the present embodiment, clients are only required to refresh their status (i.e. indicate 802.1p compliance or lack thereof) in response to periodic prompting by switch 210. In the present embodiment, switch 210 generates periodic LeaveAll messages. If switch 210 detects a GMRP response to the LeaveAll message from the client within a preselected time period, the present embodiment proceeds to step 308. If switch 210 does not detect a GMRP message from the client within a preselected time period, the present embodiment proceeds to step 310. Although one embodiment of the present invention specifically recites prompting a response from the client (e.g. generating a LeaveAll message), the present invention is also well suited to setting a timer and waiting for the client to speak GMRP within a preselected period of time without prompting the client with any type of message. However, in the present embodiment, if switch 210 forgets the MAC address of the client and then later relearns that MAC address, switch 210 will require the client to restate that it is 802.1p compliant.

At step 308, provided that the client was found by switch 210 to be 802.1p compliant, switch 210 stores a state variable in memory 211 indicating that the MAC address (and the client corresponding thereto) is 802.1p compliant. The present embodiment then proceeds to step 312.

At step 310, provided that the client was not found by switch 210 to be 802.1p compliant, switch 210 stores a state variable in memory 211 indicating that the MAC address (and the client corresponding thereto) is not 802.1p compliant. As in step 308, the present embodiment then proceeds to step 312.

With reference next to step 312, switch 210 of the present embodiment checks the stored state variable for each MAC address and determines whether all of the MAC addresses on a given port are 802.1p compliant. In architecture 200 of FIG. 2, all clients marked as "client" (e.g. clients 220, 224, 228, and 232) are 802.1p compliant. Conversely, all clients marked as "legacy client" (e.g. clients 222 and 230) are not 802.1p compliant. Thus, in architecture 200, the MAC address for client 220 would have a corresponding state variable indicating that client 220 is 802.1p compliant. The MAC address for client 222 will have a corresponding state variable indicating that client 222 is not 802.1p compliant. The MAC address for client 224 will have a corresponding state variable indicating that client 224 is 802.1p compliant. The MAC address for client 228 will have a corresponding state variable indicating that client 228 is 802.1p compliant. The MAC address for client 230 will have a corresponding state variable indicating that client 230 is not 802.1p compliant. The MAC address for client 232 will have a corresponding state variable indicating that client 232 is 802.1p compliant. Therefore, in step 312, switch 210 of the present embodiment will determine that all the clients (only client 220) on port 212 are 802.1p compliant; all the clients (only client 222) on port 214 are not 802.1p compliant; and switch 210 of the present embodiment will determine that all the clients (only client 224) on port 216 are 802.1p compliant.

With reference still to step 312, switch 210 will also determine that all of the clients (client 228, legacy client 230, and client 232) on port 218 are not 802.1p compliant. That is, by using repeater 226, more than one client is coupled to port 218. Hence, in the present embodiment if at least one of the clients coupled to a given port of switch 210 is not 802.1p compliant, then the present embodiment proceeds to step 316. If, however, all the clients coupled to a given port of switch 210 are 802.1p compliant, then the present embodiment proceeds to step 314.

At step 314, provided that all MAC addresses coupled to a given port are 802.1p compliant, switch 210 automatically selects the Filter Unregistered Groups mode for that port. Thus, in the configuration of FIG. 2, switch 210 will automatically select the Filter Unregistered Groups mode for port 212 and port 216. As a result, switch 210 of the present invention automatically selects the optimal multicast filter mode for ports 212 and 216 without requiring any costly and error-prone network administrator intervention. Furthermore, in the present embodiment, on a dedicated switch port (a port having only one end client coupled thereto) switch 210 of the present invention automatically configures the port to Filter Unregistered Groups mode as soon as the 802.1p client indicates (via GMRP) that it is interested in receiving a multicast group.

At step 316, provided that all MAC addresses coupled to a given port are not 802.1p compliant, switch 210 automatically selects the Forward All Groups mode for the port. In so doing, switch 210 of the present invention provides legacy devices, which otherwise might be prevented from receiving desired multicast packets, the opportunity to receive desired multicast packets. As an example, if legacy client 222 desired to receive a certain multicast packet and port 214 was set to a Filter Unregistered Groups mode, legacy client would be prevented from requesting receipt of the multicast packet. In the present invention, however, switch 210 sets port 214 to Forward All Groups mode, thereby ensuring that legacy client 222 is not deprived of potentially desired multicast packets. Furthermore, in the present embodiment, on a dedicated switch port (a port having only one end client coupled thereto) switch 210 of the present invention automatically configures the port to Forward All Groups mode as soon as the client is identified as a legacy client.

Continuing still with steps 314 and 316, in the event that a port's multicast registration mode is already set to Forward All Groups mode or Forward Unregistered Groups mode, switch 210 of the present invention does not immediately change any port settings. Instead, switch 210 waits to find out whether or not all MAC addresses coupled to the port are 802.1p compliant (see e.g. steps 304–312). If any or all of the MAC addresses coupled to the port are not 802.1p compliant, switch 210 performs the process described in step 316. Conversely, if all of the MAC addresses coupled to the port are 802.1p compliant, switch 210 performs the process described in step 314. In so doing, switch 210 of the present invention avoids unnecessary toggling or selecting of port filter registration modes. Additionally, by not requiring the client to refresh its status (i.e. indicate 802.1p compliance or lack thereof) for every multicast session at step 306, switch 210 of the present invention avoids any temporary port filtering mode switch-overs, because the likelihood of an end system not generating any GMRP messages during a given multicast session is very high (especially on a shared segment). Also, in the event that a new MAC address is added to a port already set in the Filter Unregistered Groups mode, switch 210 of the present invention immediately sets a timer and waits for the new client to speak GMRP. The present invention is also well suited to prompting a newly detected client for a GMRP message. One such mechanism for prompting the client is the aforementioned LeaveAll message. If no response is detected by switch 210, the port's registration mode is changed to Forward All Groups. This, is done to avoid situations where a legacy end system is added after a port has been configured to the Filter Unregistered Groups mode.

Hence, switch 210 of the present invention keeps the correct and optimal filter mode for its ports with requiring manual intervention. Also, as mentioned above, on a dedicated switch port, the change-over to Filter Unregistered Groups is immediate if desired. On a shared segment (see e.g. repeater 226 and clients 228, 230, and 232 coupled thereto), the change-over can take some time, however, the default mode of multicast forwarding will still allow the present invention to operate effectively.

Thus, the present invention provides a method and system which allows a legacy client to operate effectively in an 802.1p environment. The present invention further provides a method and system which allows the legacy client to operate effectively in an 802.1p environment even when the legacy client shares a common port of a switch with an 802.1p compliant client. Furthermore, the present invention provides a system and method which meets the above-listed needs but which does not require constant network administrator intervention or network administrator sophistication.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, to thereby enable others skilled in the art best to utilize the invention and various embodiments with various modifications suited to the particular use contemplated. It is intended that the scope of the invention be defined by the Claims appended hereto and their equivalents.

What is claimed is:

1. A system for intelligently selecting the multicast filtering mode of a switch port, said system comprising:
   a client; and
   a switch, said switch including a port and memory, said client coupled to said port of said switch, said switch further adapted to monitor said client to determine a state variable for said client, said memory adapted to a store said state variable for said client, said switch configured to automatically select a multicast filtering mode for said port based on said state variable for said client.

2. The system of claim 1 for intelligently selecting the multicast filtering mode of a switch port wherein said switch is adapted to prompt said client for information used in determining said state variable for said client.

3. The system of claim 1 for intelligently selecting the multicast filtering mode of a switch port wherein said switch is further adapted to monitor a plurality of clients coupled to a respective plurality of ports of said switch, said switch further adapted to determine a state variable for each of said plurality of clients, said memory adapted to a store each of said respective state variables for said plurality of clients, said switch configured to automatically select a respective multicast filtering mode for each of said plurality of ports based on said respective state variables for each of said plurality of clients.

4. The system of claim 1 for intelligently selecting the multicast filtering mode of a switch port wherein said switch is further adapted to monitor a plurality of clients coupled to said port of said switch, said switch further adapted to determine a state variable for each of said plurality of clients, said memory adapted to a store each of said respective state variables for said plurality of clients, said switch configured to automatically select a respective multicast filtering mode for said port based on said respective state variables for each of said plurality of clients.

5. The system of claim 1 for intelligently selecting the multicast filtering mode of a switch port wherein said switch is configured to automatically select a Filter Unregistered Groups mode for said port when said client is 802.1p compliant.

6. The system of claim 1 for intelligently selecting the multicast filtering mode of a switch port wherein said switch is configured to automatically select a Forward All Groups mode for said port when said client is not 802.1p compliant.

7. The system of claim 4 for intelligently selecting the multicast filtering mode of a switch port wherein said switch is configured to automatically select a Filter Unregistered Groups mode for said port when each of said plurality of clients is 802.1p compliant.

8. The system of claim 4 for intelligently selecting the multicast filtering mode of a switch port wherein said switch is configured to automatically select a Forward All Groups mode for said port when at least one of said plurality of clients is not 802.1p compliant.

9. A switch which intelligently selects the multicast filtering mode of a port thereof, said switch comprising:
   a port;
   memory coupled to said port, said switch adapted to have said port coupled to a client, said switch further adapted to monitor said client to determine a state variable for said client, said memory adapted to a store said state variable for said client, said switch configured to automatically select a multicast filtering mode for said port based on said state variable for said client.

10. The switch of claim 9 for intelligently selecting the multicast filtering mode of a switch port wherein said switch is adapted to prompt said client for information used in determining said state variable for said client.

11. The switch of claim 9 for intelligently selecting the multicast filtering mode of a switch port wherein said switch is further adapted to monitor a plurality of clients coupled to a respective plurality of ports of said switch, said switch further adapted to determine a state variable for each of said plurality of clients, said memory adapted to a store each of said respective state variables for said plurality of clients, said switch configured to automatically select a respective multicast filtering mode for each of said plurality of ports based on said respective state variables for each of said plurality of clients.

12. The switch of claim 9 for intelligently selecting the multicast filtering mode of a switch port wherein said switch is further adapted to monitor a plurality of clients coupled to said port of said switch, said switch further adapted to determine a state variable for each of said plurality of clients, said memory adapted to a store each of said respective state variables for said plurality of clients, said switch configured to automatically select a respective multicast filtering mode for said port based on said respective state variables for each of said plurality of clients.

13. The switch of claim 9 for intelligently selecting the multicast filtering mode of a switch port wherein said switch is configured to automatically select a Filter Unregistered Groups mode for said port when said client is 802.1p compliant.

14. The switch of claim 9 for intelligently selecting the multicast filtering mode of a switch port wherein said switch is configured to automatically select a Forward All Groups mode for said port when said client is not 802.1p compliant.

15. The switch of claim 12 for intelligently selecting the multicast filtering mode of a switch port wherein said switch is configured to automatically select a Filter Unregistered Groups mode for said port when each of said plurality of clients is 802.1p compliant.

16. The switch of claim 12 for intelligently selecting the multicast filtering mode of a switch port wherein said switch is configured to automatically select a Forward All Groups mode for said port when at least one of said plurality of clients is not 802.1p compliant.

17. A method for intelligently selecting the multicast filtering mode of a port in a switch, said method comprising the steps of:
   a) determining whether a client is coupled to said port of said switch;
   b) provided a client is coupled to said port, monitoring said client to determine if said client is 802.1p compliant;
   c) provided said client is 802.1p compliant, selecting a Filter Unregistered Groups mode for said port to which said client is coupled; and
   d) provided said client is not 802.1p compliant, selecting a Forward All Groups mode for said port to which said client is coupled.

18. The method for intelligently selecting the multicast filtering mode of a port in a switch as recited in claim 17 wherein step b) further comprises the steps of:
   b1) provided said client is 802.1p compliant, setting a state variable in memory of said switch indicating that said client is 802.1p compliant; and
   b2) provided said client is not 802.1p compliant, setting a state variable in memory of said switch indicating that said client is not 802.1p compliant.

19. The method for intelligently selecting the multicast filtering mode of a port in a switch as recited in claim 17 wherein step b) further comprises the steps of:
   b1) prompting said client to answer affirmatively if said client is 802.1p compliant.

20. A method for intelligently selecting the multicast filtering mode of a port in a switch, said method comprising the steps of:
   a) determining whether a plurality of clients are coupled to said port of said switch;
   b) provided said plurality of clients are coupled to said port, monitoring said plurality of clients to determine if each of said plurality of clients are 802.1p compliant;
   c) provided each of said plurality of clients are 802.1p compliant, selecting a Filter Unregistered Groups mode for said port to which said plurality of clients are coupled; and
   d) provided at least one of said plurality of clients is not 802.1p compliant, selecting a Forward All Groups mode for said port to which said plurality of clients are coupled.

21. The method for intelligently selecting the multicast filtering mode of a port in a switch as recited in claim 20 wherein step b) further comprises the steps of:
   b1) provided each of said plurality of clients is 802.1p compliant, setting a respective state variable in memory of said switch indicating that each of said plurality of clients is 802.1p compliant; and
   b2) provided that at least one of said plurality of clients is not 802.1p compliant, setting a respective state variable in memory of said switch indicating that said at least one of said plurality of clients is not 802.1p compliant.

22. The method for intelligently selecting the multicast filtering mode of a port in a switch as recited in claim 20 wherein step b) further comprises the steps of:
   b1) prompting each of said plurality of clients to answer affirmatively if 802.1p compliant.

23. In a computer system having a processor coupled to a bus, a computer readable medium coupled to said bus and having stored therein a computer program that when executed by said processor causes said computer system to implement a method for intelligently selecting the multicast filtering mode of a port in a switch, said method comprising the steps of:
   a) determining whether a client is coupled to said port of said switch;
   b) provided a client is coupled to said port, monitoring said client to determine if said client is 802.1p compliant;
   c) provided said client is 802.1p compliant, selecting a Filter Unregistered Groups mode for said port to which said client is coupled; and
   d) provided said client is not 802.1p compliant, selecting a Forward All Groups mode for said port to which said client is coupled.

24. The computer readable memory unit as described in claim 23 wherein step b) of said computer implemented method stored on said computer readable medium further comprises the steps of:
   b1) provided said client is 802.1p compliant, setting a state variable in memory of said switch indicating that said client is 802.1p compliant; and
   b2) provided said client is not 802.1p compliant, setting a state variable in memory of said switch indicating that said client is not 802.1p compliant.

25. The computer readable memory unit as described in claim 23 wherein step b) of said computer implemented method stored on said computer readable medium further comprises the steps of:
   b1) prompting said client to answer affirmatively if said client is 802.1p compliant.

* * * * *